Nov. 8, 1938.    S. DE ORLOW    2,135,613
HOOD REST FOR AUTOMOBILES
Filed Sept. 30, 1936    2 Sheets-Sheet 1

Inventor
Stephen De Orlow
By Blackmore, Spencer & Flint
Attorneys

Nov. 8, 1938.  S. DE ORLOW  2,135,613
HOOD REST FOR AUTOMOBILES
Filed Sept. 30, 1936  2 Sheets-Sheet 2
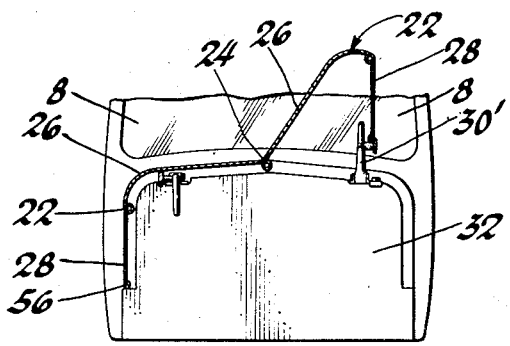
Fig. 4
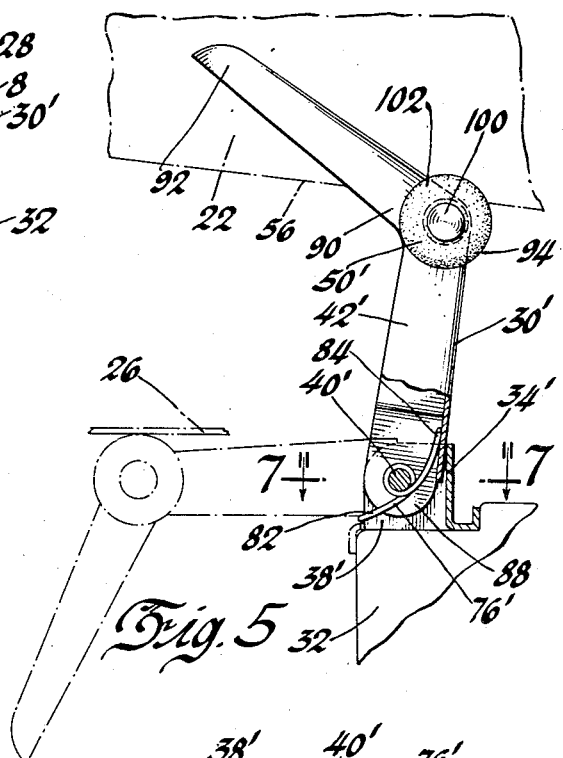
Fig. 5
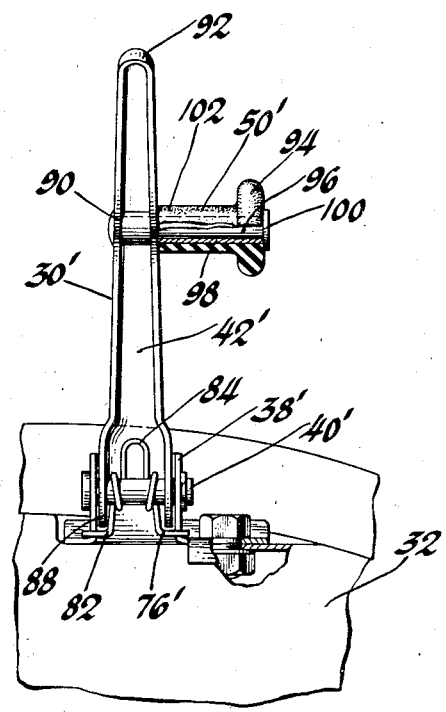
Fig. 6
Fig. 7
Inventor
Stephen De Orlow
By Blackmore, Spencer & Flint
Attorneys Patented Nov. 8, 1938

2,135,613

UNITED STATES PATENT OFFICE 2,135,613

HOOD REST FOR AUTOMOBILES

Stephen De Orlow, Detroit, Mich.

Application September 30, 1936, Serial No. 103,263

11 Claims. (Cl. 217—60)

This invention relates to hood rests for hoods of automotive vehicles.

In raising the hood of an automotive vehicle to enable inspection to be made of the engine, some difficulty has been experienced in providing a proper rest for the hood while in raised position. This has become increasingly annoying owing to the extreme curvature being given to the front end of the vehicle. In order to avoid scratching the adjacent parts of the vehicle the lowermost corners of the hood have been provided with a rubber facing and with the hood in raised position this rubber facing rests on the adjacent part of the vehicle. This has been found to be none too satisfactory for the reason that the rubber deteriorates and leaves the exposed metal which will scratch or mar the vehicle. It is the object of the present invention to make a hood rest which will obviate the difficulties experienced by the devices of the prior art.

On the drawings two species are shown in one of which a lever is pivoted to a bracket secured to the dashboard and has a spring constantly urging the lever to raised position. When in raised position a shelf or extension on the bracket furnishes a place upon which to rest the edge of the hood to hold the hood in raised position. In order that the rest may be made automatically operative the lever is provided with a slidable column having a pin at its lower end which operates in the slot in the bracket. The slot has a notch at one end to receive the pin end and cause the bracket to be held in its uppermost position to prevent the hood from falling accidentally. When the hood is released from the shelf to be placed in the lower position the inside of the top of the hood will strike the column and push it downwardly to release the pin from the catch and allow the hood to lower the lever arm against the tension of the spring.

In the second species the lever arm in its uppermost position is swung over center to prevent its falling. It has an arm extending inwardly of the hood and a considerable distance away from the perpendicular passing through the pivotal point of the lever. When the hood is lowered it will strike the end of the lever arm to cause the lever to be swung over its pivot and the weight of the hood will swing the lever downwardly against the tension of the spring urging it in the upward position. The lever is provided with a shelf as in the first species.

On the drawings

Figure 4 is a sectional view through the hood of an automotive vehicle showing the application of the second species.

Figure 5 is an enlarged detailed view of the second species of the invention showing the operative position in full line and the inoperative position in dotted line.

Figure 6 is a view of the hood rest looking from the left of Figure 5.

Figure 7 is a section on the line 7—7 of Figure 5.

Figure 1:
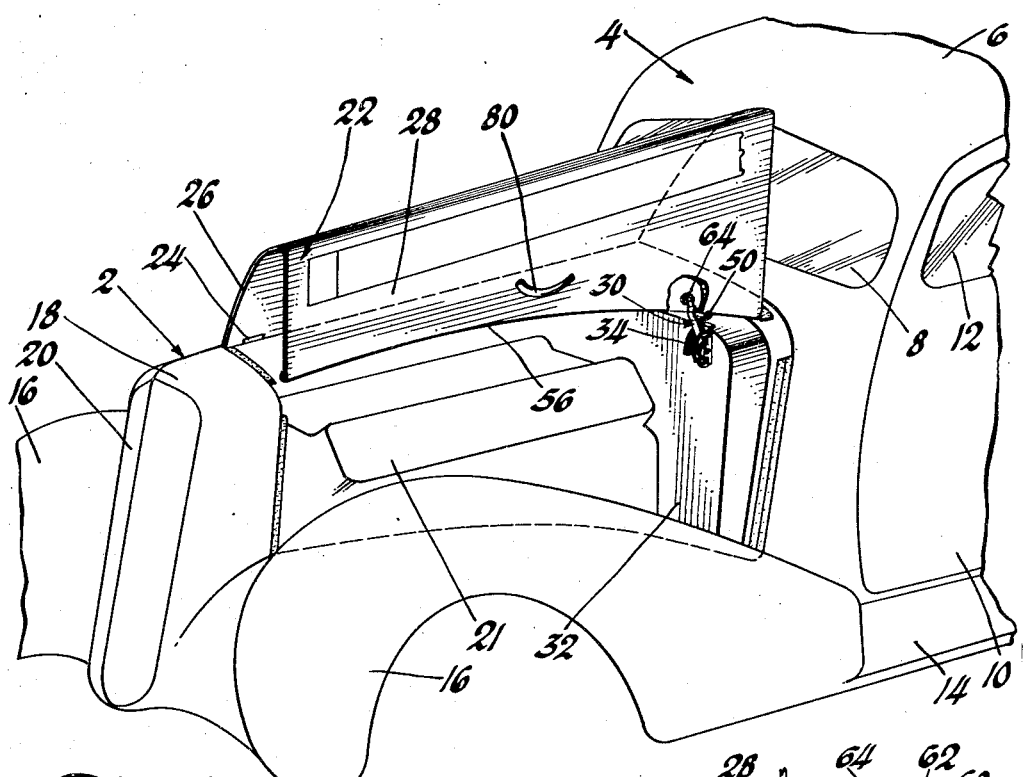
Figure 1 is a perspective view of the front part of an automotive vehicle showing the hood rest applied.

Referring to the drawings, the numeral 2 indicates an automotive vehicle as a whole. The vehicle has the usual body 4, top 6, windshield 8, front door 10 provided with a window 12, running board 14, front fender 16, radiator shell 18, grille 20, engine 21, and hood 22, all of which parts are conventional and per se form no part of the invention. The hood is hinged as at 24 and comprises the upper hinged part 26 and the lateral hinged part 28. One side of the hood is shown in raised position in Figure 1 and is shown as being retained in raised position by the novel hood rest 30 of the invention. As is best shown in Figure 1, the novel hood rest of the invention is secured to the dash or the cowl pan 32.

Figure 3:
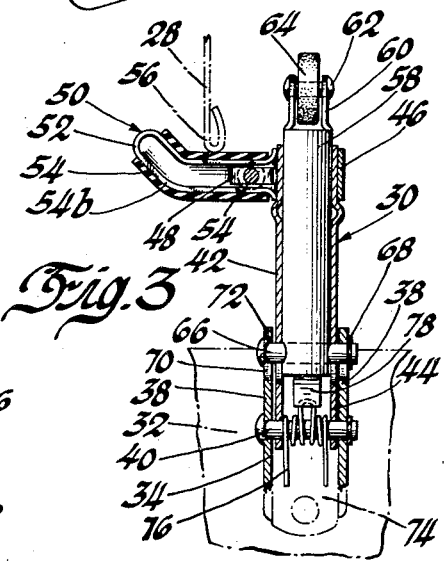
Figure 3 is a section through the hood rest taken on the line 3—3 of Figure 2.

The hood rest in question includes the bracket 34 secured to the cowl pan 32 by means of suitable rivets 36. The bracket has the lateral ears 38 bent away from the base of the bracket and each ear is provided with an opening in which to mount the shaft 40 on which the lever or arm 42 is pivoted. The lever 42 is cylindrical and has its lower end forked as at 44, each tine of the fork having an opening through which the shaft 40 passes. At its upper end the arm 42 is embraced by a collar 46. The collar is integral with an extension 48 which forms the tubular shelf or arm 50 which projects away from the lever 42 at substantially right angles and has its outer extremity 52 upwardly bent as is best shown in Figure 3. The extension 48 or shelf 50 is formed of the two halves 54a and 54b which are bent around the lever end into mating relation and are secured together by means of a rivet 54 which passes through both halves 54a and 54b. Over the shelf 50 there is slipped a section of hose 54 to form an antisqueak or antinoise material for the edge 56 of the hood section 28 when it is in raised position. The sides of the arms 54a and 54b where the rivet 54 passes through are countersunk to bring the rivet heads flush with the outer surface.

In the lever or arm 42 there is telescopically and slidably mounted the column 58 having its upper end forked at 60 to receive an axle 62 on which a roller 64 is mounted. The roller 64 is preferably made of felt or other suitable antisqueak material. At the lower end of the collar 58 there is mounted the pin or peg 66 which projects beyond the sides of the ears 38 and is held in place by means of the C washer 68. The pin 66 rides in the arcuate slot 70 provided with a notch 72 at its upper end. When the lever 42 is swung on its pivot 40 the pin 66 will ride in the slot 70 and when it reaches the uppermost end of the slot it will be forced into the notch 72 by means of the spring 76. The spring 76 is coiled intermediate its ends and is received around the axle 40. The free ends of the spring 76 bear against the base of the bracket 74 while the rounded or looped end bears against an arm 78 secured to the lower end of the column 58.

Figure 2:
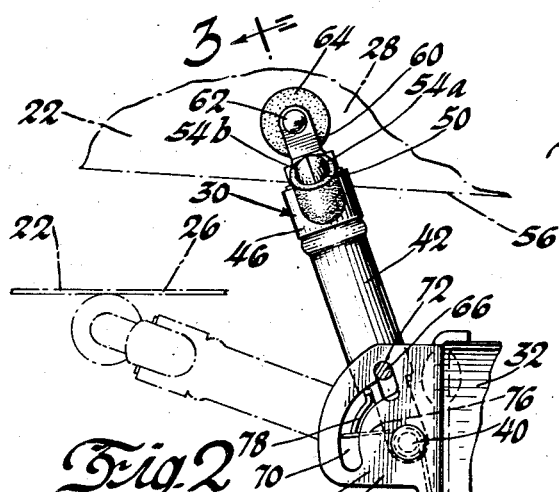
Figure 2 is an enlarged detailed view of the hood rest showing the operative position in full lines and the inoperative position in dotted line.

The operation of the device is as follows: the parts are originally in the dotted line position shown in Figure 2. When the operator raises the hood 22 the spring 76 will swing the lever arm 42 from the position shown by the dotted lines of Figure 2 to the position shown in full lines. This will expose the shelf 50 on which the edge 56 of the hood may now be placed. The position of the pin 66 in the notch 72 will prevent the lever from falling. The hood may be retained in the raised position for any desired length of time and when the operator has finished inspecting the engine the handle 80 of the hood is seized and the hood raised off the shelf 50. When the upper section 26 of the hood strikes the roller 64 the weight of the hood will cause the column 58 to be moved downwardly against the tension of the spring 76 to cause the pin 66 to move from the notch 72 and with the column 58 now disengaged from the notch the weight of the hood will swing the lever from the full line position in Figure 2 to the dotted line position. The spring will constantly urge the arm upwardly and keep the roller 64 against the inside of the hood to prevent rattle. It should be noted that the lever 42 in its raised position is not vertical but inclined as shown in Figure 2.

In the species of Figures 4 to 7 the conventional parts of the vehicle have been given the same numbers. The hood rest 30' of the invention is also equipped with a bracket 34', likewise secured to the dashboard or cowl pan 32. The bracket has the ears 38' which are perforated to receive the axle 40' having the spring 76' coiled thereabout. The ends 82 of the spring engage the sides of the ears 38' of the bracket while the other loop end 84 engages against the lever arm 42'. The lever arm 42' has its lower end 88 received in the ears 38' and is provided with openings through which the shaft 40' passes. The lever 42' is generally U-shaped in cross section and has a bend 90 intermediate its ends. At the bent portion the shelf 50' is mounted. The end 92 of the lever is rounded or arcuate and extends away from the cowl inwardly from the hood.

In the full line position in Figure 5 it will be noted that the shelf 50' is over center with reference to the perpendiculars passing through the shaft 40' and the shelf 50'. With the edge 56 of the hood 22 resting on the shelf as in Figure 5, the weight of the hood will keep the hood rest in the position shown. When the operator seizes the handle 80 to take the hood from the shelf and lower the hood to close the engine compartment the upper part 26 of the hood will strike the rounded end 92, the weight of the hood then swinging the lever 42' over center and causing it to move to the lowermost position shown in the dotted outline in Figure 5. The hood will move the lever against the strength of the spring 76' and in its lowermost position the enlarged head 94 of the shelf 50' will strike against the underside of the hood section 26 to prevent rattle of the parts. The head 94 also prevents the hood edge from slipping off the shelf. The shelf comprises the peg 96 secured in the lever 42', a sleeve 98 slipped over the peg 96 and retained in place by the head 100 and the rubber or other antisqueak 102 (with its head 94) placed over the sleeve 98.

The operation of the species of sheet 2 is as follows: the parts are originally in the dotted line position shown in Figure 5. When the operator moves the handle 80 to release the hood latch and raise the hood, the spring 76' will swing the arm from the dotted line position to the full line position in Figure 5. The operator may now set the hood edge 56 on the shelf 50' and the hood will be retained in raised position shown in Figure 4. When it is desired to close the hood the operator raises the hood to take the edge 56 from the shelf 94 and as the hood is lowered the upper part 56 will strike the rounded end 92 to throw the lever arm toward downward or inoperative position and gradually move it to the dotted line position in Figure 5 against the tension of the spring 76'. By now moving the hood handle 80 to cause the hood catch to engage, the hood will hold the hood latch in the operative position and against rattle.

I claim:

1. In a hood rest for the hoods of automotive vehicles, a bracket secured to the vehicle adjacent the hood, a lever pivoted to the bracket, a spring mounted between the bracket and lever and constantly urging the lever to raised position, a shelf on the lever adapted to receive the hood edge to retain the hood in raised position, and a roller on the lever, said roller adapted to contact with the hood when the hood is in lowered position to prevent rattle of the parts.

2. In a hood rest for the hoods of automotive vehicles, a bracket secured to the vehicle adjacent the hood, a lever pivoted to the bracket, a spring mounted between the bracket and lever and constantly urging the lever to raised position, a shelf on the lever adapted to receive the hood edge to retain the hood in raised position, and a sound deadening covering material over the shelf.

3. In a hood rest for the hoods of automotive vehicles, a bracket secured to the vehicle adjacent the hood, a lever, a shaft mounted in the bracket and on which the lever is pivoted, a spring coiled around the shaft and having its ends bearing against the bracket and against the lever and constantly urging the lever into raised position, a shelf on the lever adapted to receive the hood edge to retain the hood in raised position, and a roller on the lever, said roller adapted to contact with the hood when the hood is in lowered position to prevent rattle of the parts.

4. In a hood rest for the hoods of automotive vehicles, a bracket secured to the vehicle adjacent the hood, a lever, means on the bracket to pivot the lever, a column slidably mounted relative to the lever, a spring constantly urging the lever and column into raised position, means on the bracket and the column to retain the lever and column in raised position, a shelf on the lever adapted to receive the hood edge to retain the hood in raised position, the lowering of the hood causing the column to slide relative to the lever to release the said second named means and causing the hood to move the lever and column from their raised position to their inoperative position against the tension of the spring.

5. In a hood rest for the hoods of automotive vehicles, a bracket secured to the vehicle adjacent the hood, a lever, means on the bracket to pivot the lever, a column slidably mounted relative to the lever, a spring constantly urging the lever and column into raised position, means on the bracket and the column to retain the lever and column in raised position, a shelf on the lever adapted to receive the hood edge to retain the hood in raised position, and a roller on the end of the column, said roller adapted to be contacted by the hood when the hood is moved from raised to lowered position to cause the movement of the column relative to the lever to release the second named means to cause the lever and column to move downward to inoperative position.

6. In a hood rest for the hoods of automotive vehicles, a bracket secured to the vehicle adjacent the hood, a lever, means on the bracket to pivot the lever, a column slidably mounted relative to the lever, a spring constantly urging the lever and column into raised position, a slot in the bracket, a pin on the column movable in the slot, said slot having a notch at one extremity thereof in which the pin is engageable to maintain the lever and column in raised position, and a shelf on the lever adapted to receive the hood edge to retain the hood in raised position, the lowering of the hood causing the column to slide relative to the lever to release the pin from the notch to cause the hood to move the lever and column from raised position to inoperative position against the tension of the spring.

7. In a hood rest for the hoods of automotive vehicles, a bracket secured to the vehicle adjacent the hood, a lever, means on the bracket to pivot the lever, a column slidably mounted relative to the lever, a spring constantly urging the lever and column into raised position, a slot in the bracket, a pin on the column movable in the slot, said slot having a notch at one extremity thereof in which the pin is engageable to maintain the lever and column in raised position, a shelf on the lever adapted to receive the hood edge to retain the hood in raised position, and a roller on the end of the column, said roller adapted to be contacted by the hood when moved from raised to lowered position to cause the movement of the column relative to the lever to release the pin from the notch to cause the lever and column to move downward to inoperative position.

8. In a hood rest for the hoods of automotive vehicles, a bracket secured to the vehicle adjacent the hood, a lever pivoted to the bracket, said lever being bent intermediate its ends, a spring mounted between the lever and the bracket and constantly urging the lever to raised position, and a shelf mounted on the lever at the bend therein, said shelf adapted to receive the hood edge to retain the hood in raised position.

9. In a hood rest for the hoods of automotive vehicles, a bracket secured to the vehicle adjacent the hood, a lever pivoted to the bracket, said lever being bent intermediate its ends, a spring mounted between the lever and the bracket and constantly urging the lever to raised position, a shelf mounted on the lever at the bend therein, said shelf adapted to receive the hood edge to retain the hood in raised position, and a sound deadening covering on the shelf.

10. In a hood rest for the hoods of automotive vehicles, a bracket secured to the vehicle adjacent the hood, a lever pivoted to the bracket, said lever being bent intermediate its ends, a spring mounted between the lever and the bracket and constantly urging the lever to raised position, a shelf mounted on the lever at the bend therein, said shelf adapted to receive the hood edge to retain the hood in raised position, and an enlarged end portion on the shelf to prevent the hood edge from slipping from the shelf.

11. In a hood rest for the hoods of automotive vehicles, a bracket secured to the vehicle adjacent the hood, a lever pivoted to the bracket, said lever being bent intermediate its ends, a spring mounted between the lever and the bracket and constantly urging the lever to raised position, a shelf mounted on the lever at the bend therein, said shelf adapted to receive the hood edge to retain the hood in raised position, and means on the shelf adapted to contact inside the hood when the hood is in lowered position to prevent rattle of the parts.

STEPHEN DE ORLOW.